US012256221B2

(12) United States Patent
Ceesay et al.

(10) Patent No.: US 12,256,221 B2
(45) Date of Patent: Mar. 18, 2025

(54) SYSTEM AND METHOD FOR BEACON-BASED ACTION VALIDATION

(71) Applicant: Capital One Services, LLC, McLean, VA (US)

(72) Inventors: Ebrima N. Ceesay, McLean, VA (US); Clayton Johnson, Edgewood, MD (US); Jiye Luo, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 464 days.

(21) Appl. No.: 17/469,134

(22) Filed: Sep. 8, 2021

(65) Prior Publication Data
US 2023/0073560 A1 Mar. 9, 2023

(51) Int. Cl.
*H04W 12/63* (2021.01)
*H04W 4/02* (2018.01)
*H04W 4/80* (2018.01)
*H04W 12/065* (2021.01)

(52) U.S. Cl.
CPC .......... *H04W 12/63* (2021.01); *H04W 4/023* (2013.01); *H04W 4/80* (2018.02); *H04W 12/065* (2021.01)

(58) Field of Classification Search
USPC .......................................................... 726/7
See application file for complete search history.

(56) References Cited

U.S. PATENT DOCUMENTS

| 10,366,378 | B1* | 7/2019 | Han | G06Q 20/204 |
|---|---|---|---|---|
| 2013/0237190 | A1* | 9/2013 | Smith | H04L 9/3215 |
| | | | | 455/411 |
| 2014/0213306 | A1* | 7/2014 | Blankenship | H04L 69/24 |
| | | | | 455/457 |
| 2016/0019512 | A1 | 1/2016 | Buchheim et al. | |
| 2020/0092698 | A1* | 3/2020 | Samuelsson | H04W 76/11 |
| 2020/0101592 | A1* | 4/2020 | Sato | G05B 19/423 |
| 2020/0162875 | A1* | 5/2020 | Gabriele | H04W 52/0245 |
| 2021/0029528 | A1* | 1/2021 | Huang | H04W 76/11 |

(Continued)

FOREIGN PATENT DOCUMENTS

| EP | 3343874 B1 * | 11/2020 | G06Q 20/327 |
|---|---|---|---|
| WO | 2017/024245 | 2/2017 | |
| WO | 2021/091739 | 5/2021 | |

OTHER PUBLICATIONS

International Search Report and the Written Opinion of the International Searching Authority issued in related PCT Application No. PCT/US2022/042847 mailed Dec. 7, 2022.

(Continued)

*Primary Examiner* — Sakinah White Taylor
(74) *Attorney, Agent, or Firm* — HUNTON ANDREWS KURTH LLP

(57) ABSTRACT

An automated method is provided for validating an action based on beacon source proximity to a user device. A user data processing device receives from a remote action validation server an action validation request. The request includes identification of an authentication device that may include a beacon transmitter and identification of a proposed action associated with the authentication device. The user data processing device determines whether the authentication device is within beacon signal reception range of the user data processing device and transmits an action validation response to the remote action validation processing system.

20 Claims, 13 Drawing Sheets

(56) References Cited

U.S. PATENT DOCUMENTS

2021/0304163 A1* 9/2021 Vukich .............. G06Q 20/3672
2021/0326870 A1* 10/2021 Fiske ................. G06Q 20/3265

OTHER PUBLICATIONS

Notification concerning Transmittal of International Preliminary Report on Patentability issued in related PCT/US2022/042847, mailed Mar. 21, 2024, 11 pages.

* cited by examiner

SYSTEM AND METHOD FOR BEACON-BASED ACTION VALIDATION

FIELD OF THE INVENTION

This application relates generally to the use of low energy wireless beacon systems, and in particular, to a system and method for validating a proposed action based on proximity of a carrier having an authorization beacon mounted thereto.

BACKGROUND OF THE INVENTION

More and more ordinary daily activities involve the use of data processors to initiate machine-controlled actions. Such actions can include the activation of an appliance or machinery by a private individual or a company employee via the Internet or other network. They can also include financial and other transactions that involve remote communications via a telecommunications network. As the number of network-based actions increase, the likelihood of fraudulent activity also increases. While the use of passwords and coded entries may reduce vulnerability to some degree, such methods do not provide the security of a hardware-based solution.

SUMMARY OF THE INVENTION

An illustrative aspect of the invention provides an automated method for validating an action based on beacon source proximity. The method comprises receiving, by a user data processing device from a remote action validation server, an action validation request including identification of an authentication device comprising a beacon transmitter and identification of a proposed action associated with the authentication device. The method further comprises determining, by the user data processing device, whether the authentication device is within beacon signal reception range of the user data processing device and transmitting, by the user data processing device to the remote action validation processing system, an action validation response.

Another aspect of the invention provides an action validation user data processing device comprising a data processor, a wireless communication interface, a beacon signal receiver, a user interface, and a memory accessible by the data processor. The wireless communication interface is in communication with the data processor and configured for selective communication over a wireless network. The beacon signal receiver is configured for receiving a beacon signal from a transmitting beacon. The user interface comprises at least a user input device and a display. The memory has stored thereon a beacon monitoring application including instructions for the data processor to receive the beacon signal from the beacon signal receiver and process the beacon signal to identify the transmitting beacon. The memory also has stored thereon an action validation application including instructions for the data processor to receive, from a remote action validation server via the wireless communication interface, an action validation request. The request includes identification of an authentication device having a beacon transmitter attached thereto and identification of a proposed action associated with the authentication device. The action validation application also includes instructions for the data processor to determine whether the authentication device is within beacon signal reception range of the mobile action validation interface device and transmit, to the remote action validation server via the wireless communication interface, an action validation response.

Another aspect of the invention provides an action validation system comprising a transaction card and a user data processing device. The beacon signal transmitter is configured for low energy radio transmission, continuously or at regular intervals, of a beacon signal comprising a beacon identifier associated with the transaction card. The transaction card also includes a beacon transmitter power source in electrical communication with the beacon signal transmitter. The user data processing device includes a user device data processor and a wireless communication interface in communication with the data processor and configured for selective communication over a wireless network. The user data processing device also includes a beacon signal receiver configured for receiving the beacon signal, a user interface comprising at least a user input device and a display, and a memory accessible by the data processor. The memory has stored thereon a beacon monitoring application including instructions for the data processor to receive the beacon signal from the beacon signal receiver and process the beacon signal to determine the beacon identifier. The memory also has stored thereon an action validation application including instructions for the data processor to receive, from a remote transaction validation processing system via the wireless communication interface, an action validation request. The request includes identification of the transaction card and identification of a proposed transaction for an account associated with the transaction card. The action validation application also includes instructions for the data processor to determine whether the transaction card is within beacon signal reception range of the user data processing device and to transmit, to the remote transaction validation processing system via the wireless communication interface, an action validation response.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method actions does not preclude the presence of additional method actions or intervening method actions between those actions expressly identified. Similarly, it is also to be understood that the mention of one or more components in a device or system does not preclude the presence of additional components or intervening components between those components expressly identified.

The present invention provides systems and methods for authenticating an action associated with an individual or an account. In embodiments of the invention, a request to take a particular action can be authenticated by a user device—with or without the knowledge of the user, depending on the embodiment—through an automated process that verifies that an authentication device is within a certain proximity of the user device. In particular embodiments, the authentication device may include a low energy transmitter (e.g., a Bluetooth Low Energy (BLE) device detectable by the user device when the authentication device is within a limited range. In such embodiments, authentication of any action associated with the user, the user device, and/or the authentication device may require that a signal be received by the user device from the authentication device.

Figure 1:
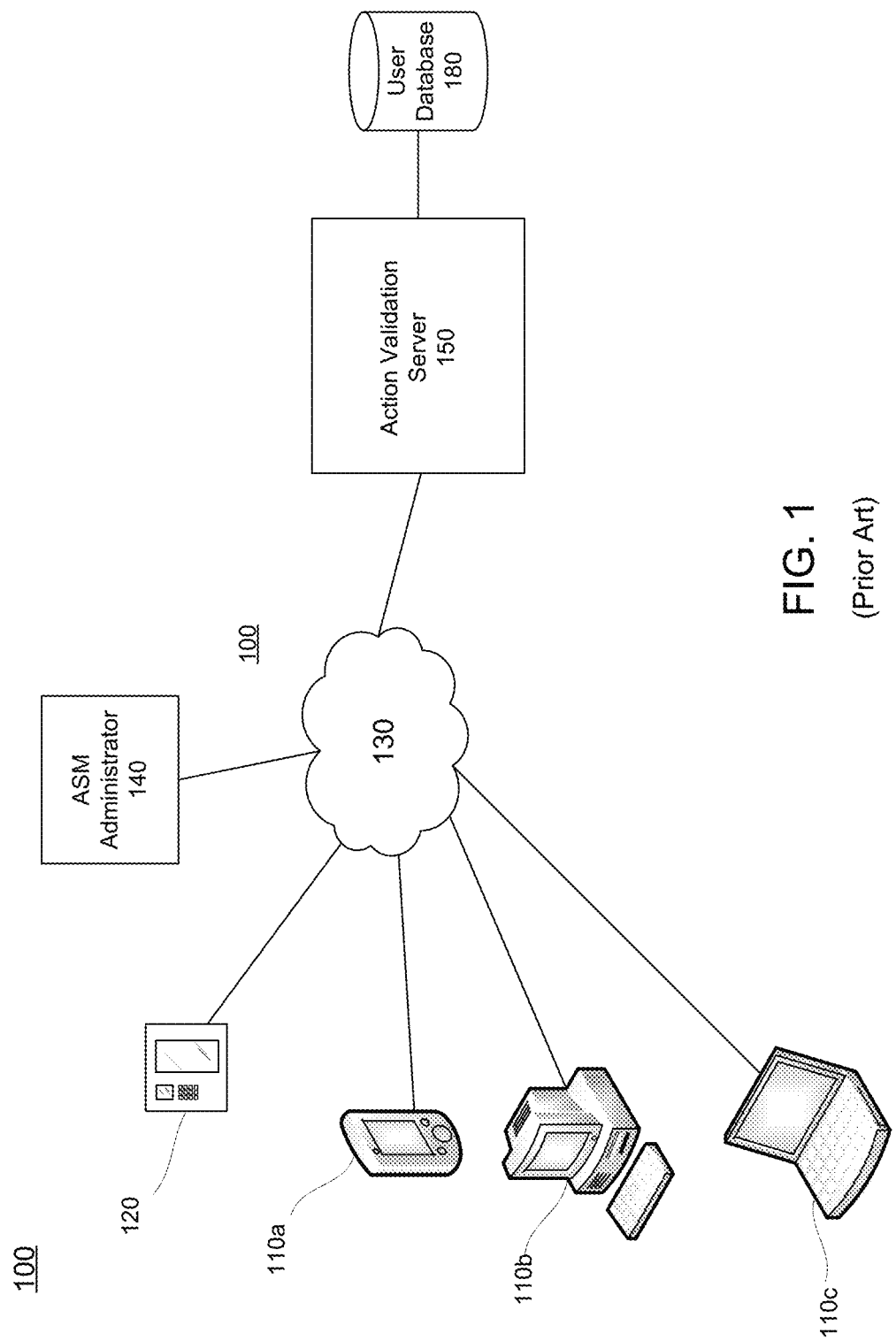
FIG. 1 is a schematic representation of a prior art action validation system.

With reference to FIG. 1, methods of the invention can be implemented on or in conjunction with an action processing system 100 established to authenticate and process action requests associated with a user or a user account. The action requested may be any form of action at least partially implemented on or by a digitally controlled machine. The system 100 may include a number of network-enabled computer systems, including, as depicted in FIG. 1, one or more user devices 110, one or more action service machines (ASM) 120, an ASM administrator 140, and an action validation server 150. Any or all of these system elements may be capable of communication with one another via a communication network 130. In some embodiments, certain components of the system 100 may communicate with one another via a second network in addition to or instead of the network 130.

As referred to herein, a network-enabled processor, computer system or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

Figure 3:
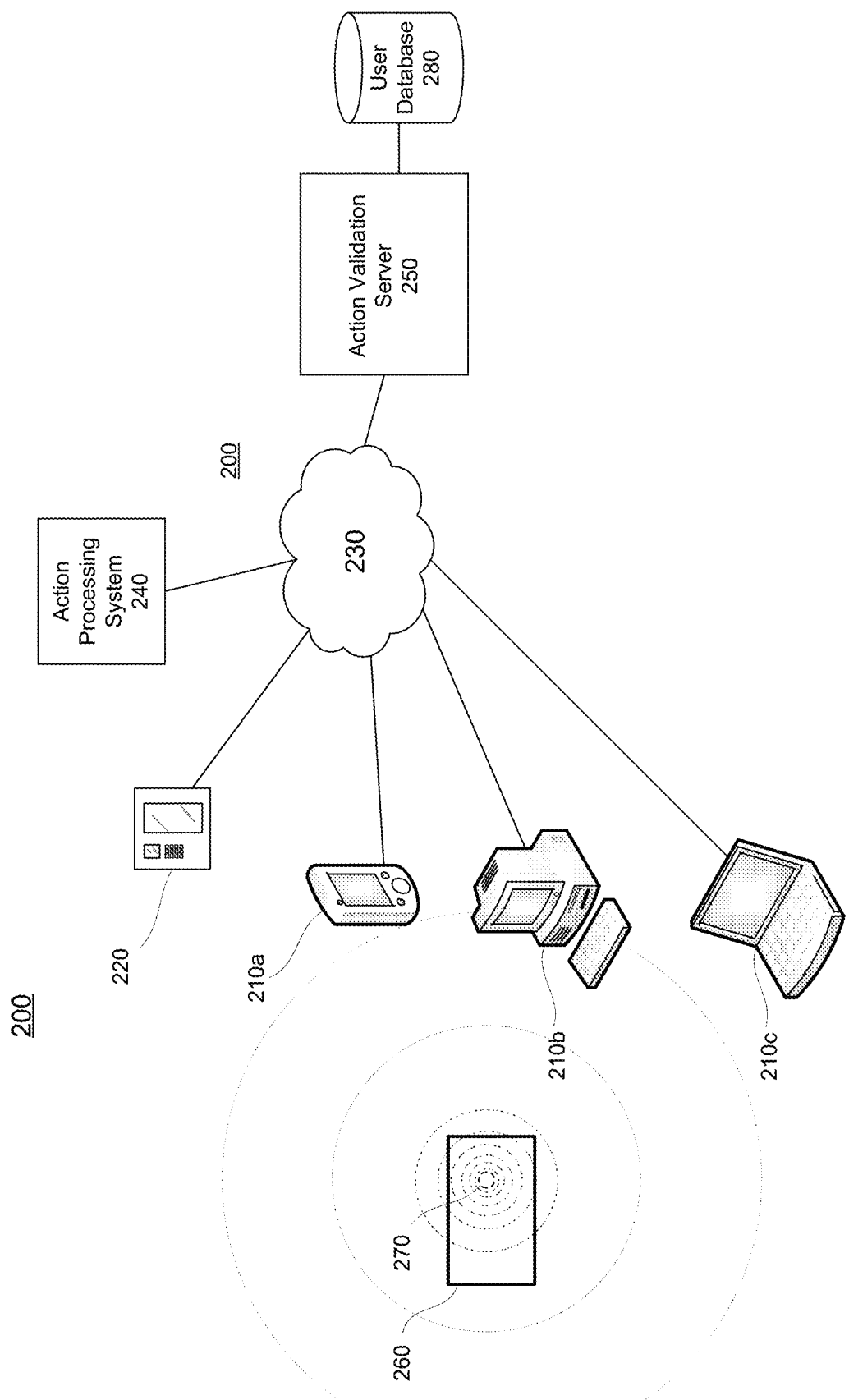
FIG. 3 is a schematic representation of a beacon-based system for validating an action according to an embodiment of the invention.

The network-enabled computer systems used to carry out the methods contemplated by the invention may execute one or more software applications to, for example, receive data as input from an entity accessing the network-enabled computer system, process received data, transmit data over a network, and receive data over a network. The one or more network-enabled computer systems may also include one or more software applications to send notifications to an account holder or other user. In some examples, computer systems and devices may use instructions stored on a computer-accessible medium (e.g., a storage device such as a hard disk, floppy disk, memory stick, CD-ROM, RAM, ROM, etc., or a collection thereof). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein. It will be understood that the depiction in FIG. 3 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

The network 130 may be any form of communication network capable of enabling communication between the transaction entities of the transaction monitoring system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

As used herein, the term "action service machine" or "ASM" means a network-enabled machine that can receive an action request, verify user authorization, communicate with a central action processing system, and implement the requested action. In some embodiments, the ASM 120 may be a remotely controlled machine or appliance that can be activated by authorized personnel using remote code entry. In particular embodiments, the ASM 120 may be an ordinary merchant transaction processing device or an automated service machine and the requested action may be the processing of an account-related transaction. In some embodiments, the ASM 120 may be configured for processing card-based purchase or other monetary transaction. In some embodiments, the ASM 120 may be a machine configured for carrying out a cash-related service. This could be, for example, an automated teller machine (ATM) or a machine configured for receiving coins and returning paper money. In some embodiments, an ASM may be an automated product or service vending machine that is configured for carrying out an account-based transaction in addition to its ordinary dispensing function.

The ASM administrator system 140 may be or include a network-enabled processing system that is configured for receiving action requests and/or other action-related information from the ASM 120 or from a user device 110. The ASM administrator system 140 may be further configured for processing a user or account-related action request and transmit action-related instructions to the requesting ASM 120 or user device 110. In certain embodiments, for example, the action request may be or include a request to process a purchase or other financial transaction using a user financial account. In such embodiments, the ASM administrator system 140 may be configured to verify account information and authorization for the requested transaction, post the transaction to the account, and transmit instructions to the requesting device to complete the transaction. The ASM administrator system 150 may also be configured to transmit an action validation request to the action validation server 150. In some embodiments, the ASM administrator 140 may also be configured to receive an action validation response from the action validation server 150. Depending on the response, the system 150 may instruct the action requesting system to implement the requested action or may prevent the action from being completed.

The action validation server 150 is a network-enabled processing system configured for communication with one or more user devices 110 and the ASM 120 via the network 130. The server 150 may also be in communication with a user information database 180 containing user information records. The action validation server 150 may be configured to receive an action processing validation request from the ASM administrator system 150 or directly from the ASM 120 or a user device 110. The action validation server 150 may be further configured to transmit an user validation request to a user device 110 associated with an account or user identified in the action request. The action validation server 150 may be further configured to receive a positive or negative validation response from the user device 110 and to transmit an appropriate "process" or "deny" response to the validation requestor.

A user processing device 110 may be any data processing and/or communication device that an account holder uses to carry out an action and/or to communicate with an ASM 120, an action processing authority (e.g., ASM manger system 140), or the action validation server 150 including, but not limited to a smartphone 110*a*, a desktop computer 110*b*, a laptop computer 110*c*, and a tablet (not shown). As will be discussed in more detail hereafter, the user devices 110 may each be configured to receive an action validation request from the action validation server 150, establish a validation result, and transmit a validation response back to the action validation server.

Figure 2:
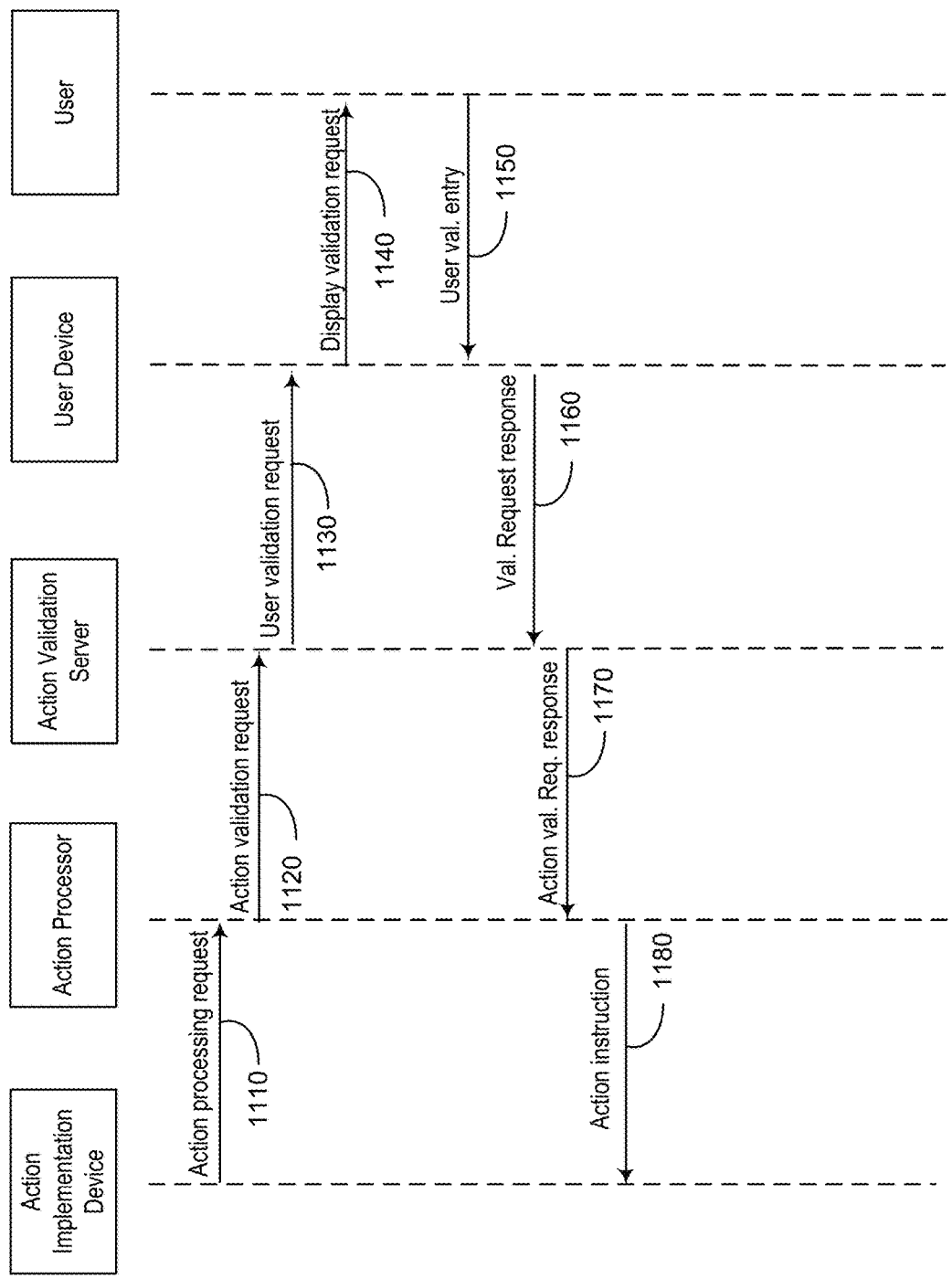
FIG. 2 is a sequence diagram illustrating a prior art action validation scenario.

With reference now to FIG. 2, a typical user-involved validation scenario will be described. In this scenario, an action-requesting user has asked for an action to be taken by an action implementation device (e.g., ASM 120 or a network-connected computing device) where the action is associated with a particular user or user account. At 2110, the action implementation device sends an action processing request to an action processor (e.g., ASM administrator system 140). At 2120, the action processor sends a request for validation to an action validation server. The action validation server then, at 2130 sends a user validation request to a user device (e.g., one or more of user devices 110*a*, 110*b*, 110*c*) associated with the particular user or user account. At 2140, the user device displays a notification to the user and requests that the user confirm that the action should be allowed to proceed. At 2150, the user enters a validation response (positive or negative) into the user device. The user device then sends the validation response to the action validation server at 2160. The action validation server, in turn, sends a response at 2170 to the action processor indicating whether the requested action has been validated or not. Based on this indication, the action processor sends an instruction to the action implementation device at 2180 to either carry out the action or to deny the action request.

The above scenario requires verification of the requested actions validity by the user/account holder associated with the requested action. With reference to FIG. 3, embodiments of the present invention provide an action processing system 200 that provides automated validation based on the presence of an authentication device 260 associated with the user or account. The system 200 may include a number of network-enabled computer systems, including, as depicted in FIG. 3, one or more user devices 210, one or more ASMs 220, an action processing system 240, and an action validation server 250. Any or all of these system elements may be capable of communication with one another via a communication network 230. In some embodiments, certain components of the system 200 may communicate with one another via a second network in addition to or instead of the network 230.

Figure 4:
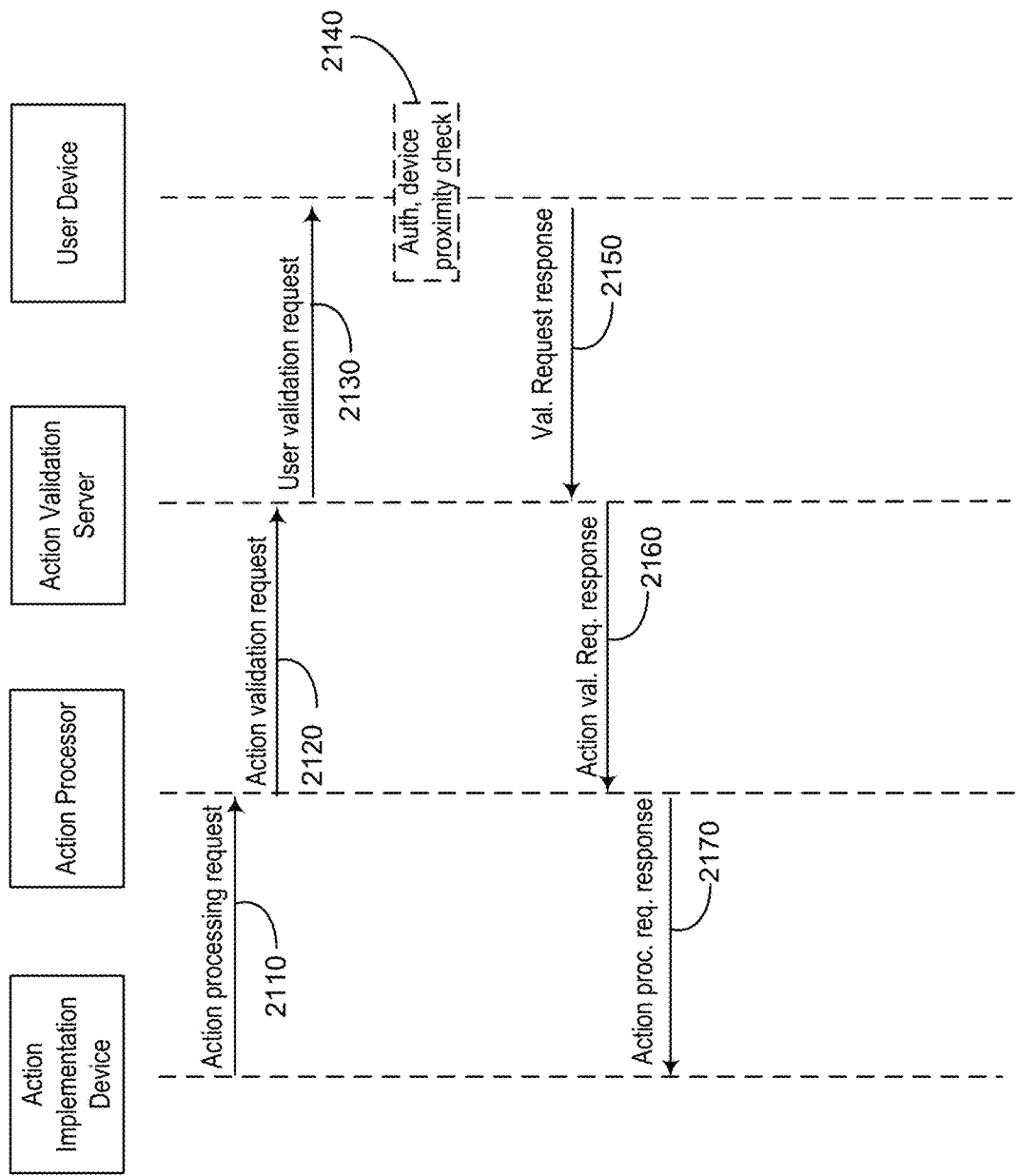
FIG. 4 is a sequence diagram illustrating an action validation scenario according to an embodiments of the invention.

As will be discussed in more detail hereafter, the system 200 may be used to authenticate a service request based on the proximity of the authentication device 260 to one of the user devices 210. FIG. 4 illustrates a validation scenario in which validation is assured by the presence of an authentication device and in which user validation is not required. As in the previous scenario, an action-requesting user has asked for an action to be taken by an action implementation device (e.g., ASM 220 or a network-connected computing device) where the action is associated with a particular user or user account. At 2110, the action implementation device sends an action processing request to an action processor. At 2120, the action processor sends a request for validation to an action validation server, which, at 2130 sends a user validation request to a user device. In this scenario, at 2140, the user device conducts a check to see if the authentication device is within the required proximity of the user device. As will be discussed in more detail, this may be accomplished by determining whether the user device is within receiving range of a low energy signal transmitted by the authentication device. If the user device confirms that the authentication device is within the required proximity, the user device returns a positive response to the action validation server at 2150. If the user device is unable to confirm the required proximity, the user device returns a negative response. The action validation server, in turn, sends a response at 2160 to the action processor indicating whether the requested action has been validated or not. Based on this indication, the action processor sends an instruction to the action implementation device at 2170 to either carry out the action or to deny the action request.

Systems and components of the action processing system 200 will now be described in more detail.

Similar to the network 230 of FIG. 2, the network 230 may be any form of communication network capable of enabling communication between the transaction entities of the transaction monitoring system 200. For example, the network 230 may be one or more of a wireless network, a wired network or any combination of wireless network and wired network. Although the network 230 is depicted as a single network, it will be appreciated that it may comprise a plurality of interconnected networks, such as, for example, the Internet, a service provider's network, a cable television network, corporate networks, and home networks.

The ASM 220 may be an ordinary merchant transaction processing device or an automated service machine and the requested action may be the processing of an account-related transaction. In some embodiments, the ASM 220 may be configured for processing card-based purchase or other monetary transaction. In some embodiments, the ASM 220 may be a machine configured for carrying out a cash-related service. In some embodiments, an ASM may be an automated product or service vending machine that is configured for carrying out an account-based transaction in addition to its ordinary dispensing or service function. While only a single ASM 220 is shown in FIG. 3, it will be understood that the system 200 may include any number of ASMs 220.

Figure 5:
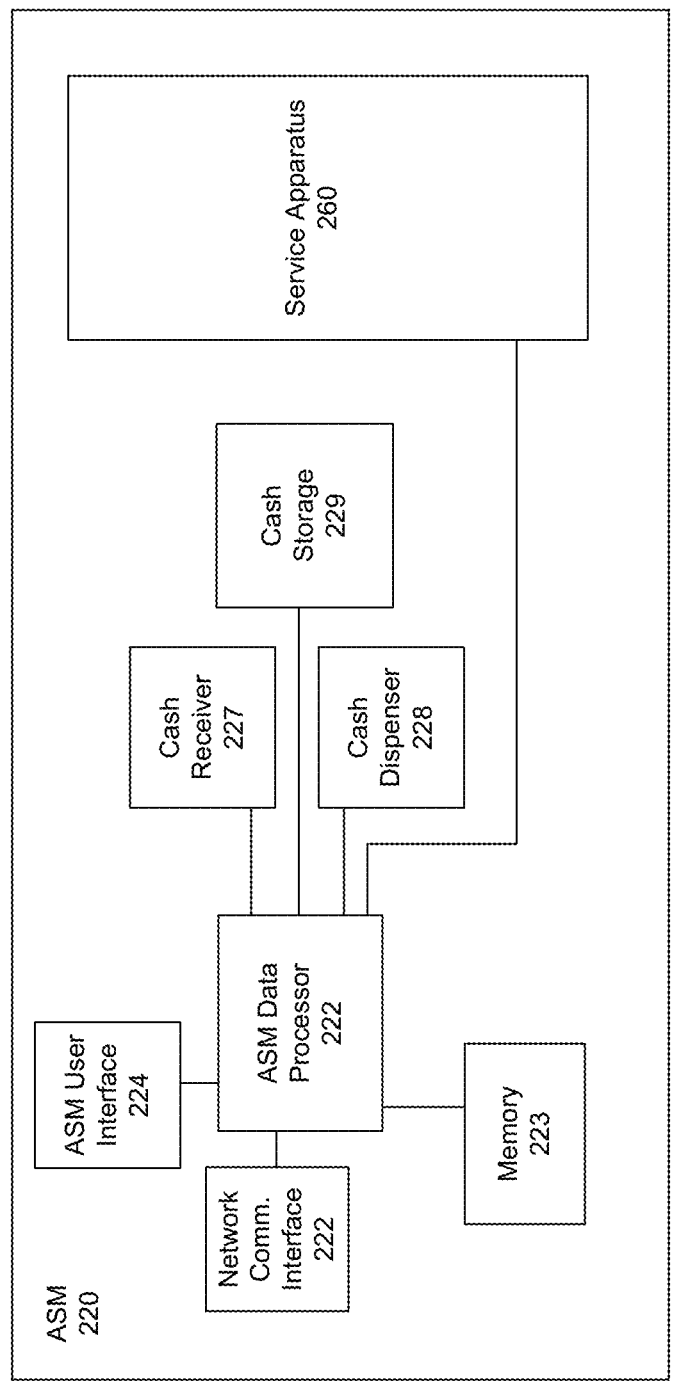
FIG. 5 is a schematic representation of an automated service machine usable in conjunction with embodiments of the invention.

FIG. 5 is a schematic representation of an exemplary ASM 220. The exemplary ASM 220 includes an ASM data processor 221 and a user interface 224 that is configured for receiving information from and displaying information to an ASM user. The user interface 224 may include any device for entering information and instructions into the ASM, such as a touch-screen, keyboard, cursor-control device, microphone, stylus, or digital camera. The user interface 224 may also include a display, which can be any type of device for presenting visual information such as a computer monitor, a flat panel display, and a mobile device screen, including liquid crystal displays, light-emitting diode displays, plasma panels, and cathode ray tube displays.

The exemplary ASM 220 includes either or both of a cash receiver arrangement 227 and a cash dispenser 228. The cash receiver arrangement 227 may be any mechanism configured for securely receiving cash from a user, determining an amount of cash received, and depositing the cash into a secure cash storage arrangement 229. In some embodiments, the cash receiver arrangement may also be configured for receiving and scanning checks or other documents required for processing an ASM transaction. The cash dispenser 228 may be any mechanism configured for drawing a specified amount of cash from a cash storage arrangement 229 and dispensing it to an authorized ASM user.

In some embodiments, the ASM 220 may include a service apparatus 260 in communication with the ASM data processor 221. The service apparatus 260 may be or comprise any machine for providing an automated service. This could include, for example, the conventional machinery for an automatic car wash or a machine for exchanging coins for paper currency. The operation of the service apparatus 260 may be controlled by the ASM data processor 221 and may make use of the cash receiver 227 and cash dispenser 228 for product or service purchase transactions. In some embodiments, the service to be provided is, itself, reception of cash for deposit into a user's account, which may not require additional service apparatus 260.

The ASM 220 includes an ASM data processor 221 configured to communicate over the network 230 via a network communication interface 222. The ASM data processor 221 is in communication with a memory 223, which has stored therein information associated with the operation of the ASM 220. This may include identification information (e.g., an ASM identifier) and/or location information. The memory 223 may also have applications installed therein with instructions for carrying out vending and reporting operations. This may include, for example, an application configured for processing machine services or product purchases and providing instructions to the service apparatus 260. It may also include instructions for constructing an action request, transmitting the action request to the action processing system 240, receiving a request response from the action processing system 240, and, depending on the response, either initiating the action or declining the action.

The action processing system 240 may be or include a network-enabled processing system that is configured for receiving action processing requests and/or other action-related information from the ASM 220, a user device 210 or other requesting system. In some embodiments, the action processing system may be associated with an action provider that administers the processing of a particular action requests. For example, in an instance where the requested action is to process a transaction at a merchant store, the action provider may be the merchant or a financial transaction facilitator. In this scenario, the action processing system 240 may be a remote server configured for receiving the action processing request from an ASM 220 at the store. The action provider may be charged with assuring that the transaction is processed only upon verification of an account and of user authorization for the account. In another example, the action request could be a request by a user to activate a device or system in a particular facility. In this case, the action processor could be a facility management entity charged with assuring that actions only be taken by authorized users. In other examples, the action processing system 240 may be an ASM administrator.

In any of the above examples, the action processing system 240 may be configured for processing a user or account-related action processing request and transmit action-related instructions to the requesting device or system. In instances where the action processing request is associated with an account (e.g., a financial, service, or other user account), the action processing system 240 may be configured to verify account information and authorization for the requested action and transmit instructions to the requesting device to carry out the requested action (e.g., complete a financial transaction or initiate service or product delivery). In various embodiments of the invention, the action processing system 240 is also configured to transmit an action validation request to the action validation server 250, receive an action validation response from the action validation server 250, and depending on the response, instruct the action requesting system to implement the requested action or prevent the action from being taken or completed.

Figure 6:
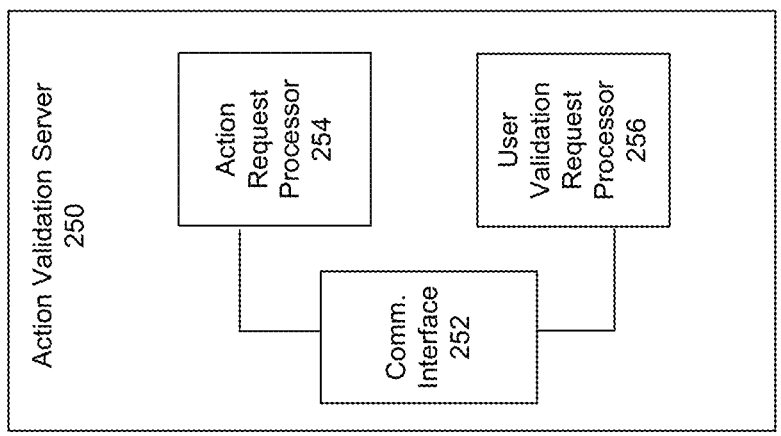
FIG. 6 is a schematic representation of an action validation server according to an embodiment of the invention.

With reference to FIG. 6, the action validation server 250 is a network-enabled processing system configured for communication with one or more user devices 210, the ASM 220, the action processing system 240, and other action requesting entities via the network 230. The server 250 may also be in communication with a user information database 280 containing user information records. In embodiments of the invention, the action validation server 250 includes a secure communication interface 252 in communication with the network 230 and configured for communication with the other components of the system 200 via the network 230 and to provide an initial security screen to validate such communications.

The server 250 further includes an action request processor 254 that is configured for receiving action validation requests from an action validation requester. An action validation request may be received as a separate, standalone request or may be made as part of an on-line interactive session between, for example, a user device 210 and the action validation server 250. In particular embodiments, the request may be transmitted by a user device 210 using an application resident on the user device 210. In other instances, the action request may be received from an action processing system 240 or directly from an ASM 220. In any of these instances, the action validation request may include identification information usable by the request processor 254 to identify the requesting system and a user device and/or account associated with a particular user or users. The request may further include information about the action being requested. This may include information indicating the type and characteristics of the action. In instances where the action relates to a financial transaction, the information may include details of the type of transaction and the monetary amounts involved. In some embodiments, the action request information may also include action implementation or requester location information. The action validation request processor 254 may be configured to use request information to identify a user account and/or obtain additional account or user device information from records stored in the user database 280. In some embodiments, the request information includes information usable by the action request processor to conduct an initial authorization verification to assure that the user and/or the requester is authorized to request and carry out the requested action. In some embodiments, this may require obtaining authorized action validation requester information from a requester database (not shown).

The action validation server 250 also includes a user validation request processor 256 that is configured to construct a user validation request for transmission to one or more user devices 210 associated with the user account identified in or determined based on the action validation request information. The user validation request is configured to instruct the receiving user device 210 verify the presence of the authentication device 260 within a certain proximity of the user device 210. The user validation request may include some or all of the action request information. Alternatively, the user validation request may include no action information, and is configured solely to elicit verification of the presence of the authentication device 260. The user validation request processor 256 may be further configured to transmit the user validation request to the one or more user devices 210 and to receive a response from the one or more user devices 210, in both cases via the communication interface 252 and the network 230. A user validation response from a user device may include a positive indication that the authentication device 260 is present or a negative indication that the authentication device 260 is not present. In some embodiments, the user validation response may include information usable by the user validation request processor 256 to determine whether the authentication device 260 is within the required proximity of the user device 210. This information could include, for example, signal strength of a signal transmitted by the authentication device 260 and received by the user device 210.

The action request processor 254 may be configured to, upon establishing that the authentication device 260 is present (i.e., within a predetermined proximity of an account-associated user device 210) or not, construct a validation request response for transmission to the requesting system/device. The validation request response includes an indication of either a positive or negative validation result and may include additional information relating to the action request. The user validation request processor 256 may be further configured to transmit the validation request response to the requesting system/device via the communication interface 252 and the network 230.

As discussed above, embodiments of the present invention make use of the ability of a user processing device to determine a relative proximity of an authentication device. In the context of the system 200 of FIG. 3, the invention provides an authentication device 260 that is configured to transmit a signal and one or more user devices 210 specifically configured to receive that signal when the user device 210 is within reception range of the authentication device. Particular embodiments of the invention accomplish this through the implementation of wireless beacon technology.

Wireless beacons are devices that generate and continuously or periodically transmit wireless signals over greater distances than near field communication (NFC) systems but still within a relatively small area of coverage. As used herein the term "beacon" refers to a wireless transmitter that constantly, periodically, or randomly broadcasts a signal regardless of the presence of a receiver within reception range of the transmitter. While some beacon transmitters are designed for reception within a 50-150 foot radius, certain very low energy BLE transmitters may be designed for reception only within 10 feet or less. Wireless beacons of this type have extremely low power requirements and may essentially be made permanently active with a very small power storage or regenerative power source.

Figure 7:
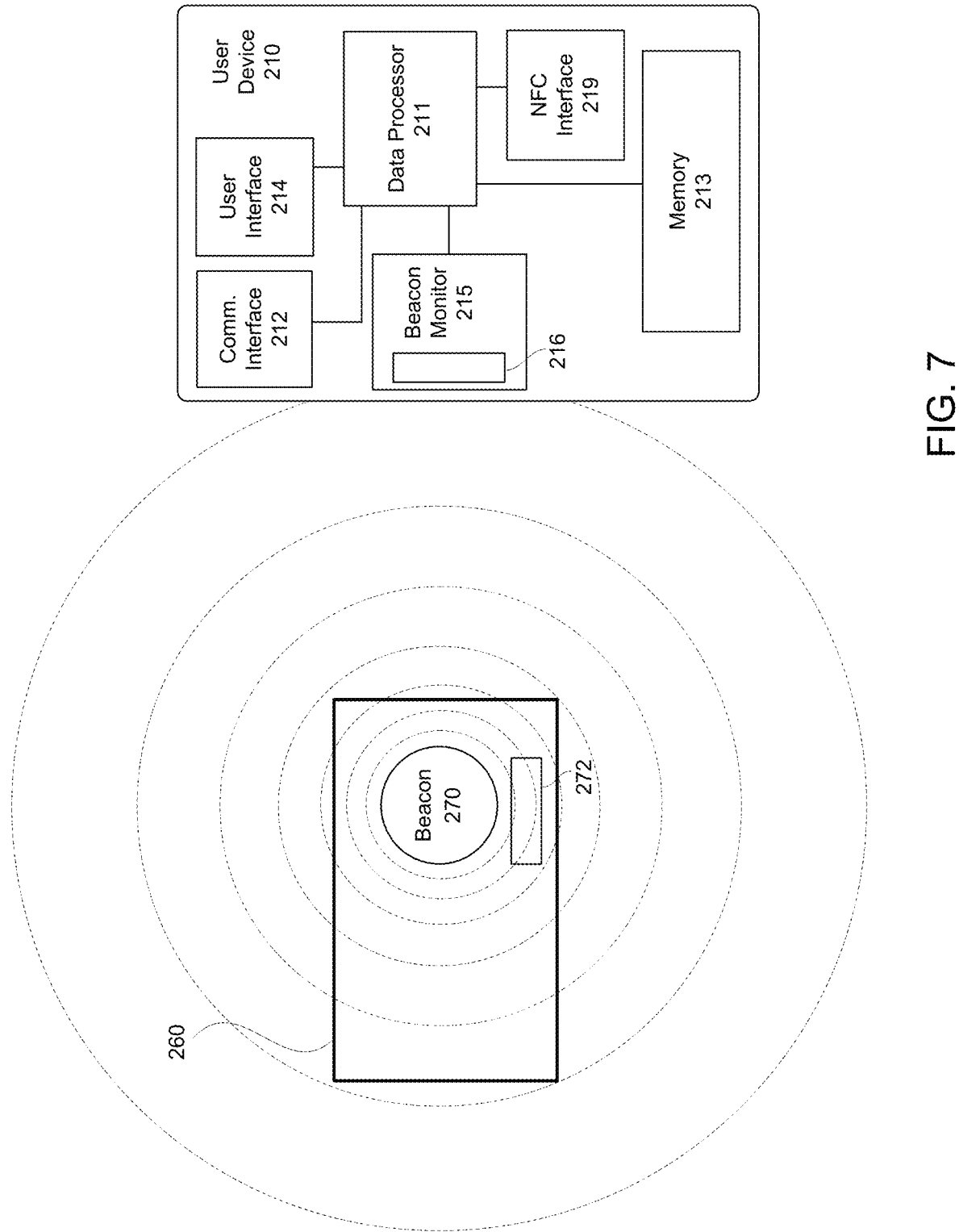
FIG. 7 is a schematic representation of an authentication device and a user data processing device according to embodiments of the invention.

FIG. 7 schematically illustrates a transmitting authentication device 260 and a receiving user device 210 that is within receiving range of the authentication device 260. The authentication device 260 may be any device or substrate configured for carrying a very low energy beacon 270 and its associated power source 272. In typical embodiments, the authentication device 260 may be a card (e.g., a personal identification card, employee identification card, or a transaction card) or other small substrate that may be conveniently carried and/or otherwise kept nearby an account holder's user device 210. In some embodiments, the authentication device 260 may itself be a separate user data processing device that has the beacon 270 incorporated into or attached to it.

The beacon 270 has an associated range volume throughout which the beacon's broadcast signal strength exceeds a level detectable by a user device. In embodiments of the invention, the range volume has a spherical radius that is less than ten feet. In particular embodiments, the range volume has a spherical radius in a range of 1-3 feet. In typical embodiments, the beacon 270 has a unique identifier that is included in its transmitted signal. This identifier may be associated with a particular user account or other user-related information. In some embodiments, the beacon signal may contain two numbers referred to herein as the beacon's major and minor identifiers. These identifiers may be used to identify the beacon 270 and to provide additional information. In some applications, the beacon's signal may include a source identifier that identifies an issuing entity (e.g., a merchant, ASM administrator, or action validation service provider).

The beacon power source 272 may be or include a battery and/or a regenerative power source. The latter could include a kinetic power scavenger and/or a capacitor or other storage unit that can be used for selectively powering the beacon for short transmission bursts. In some embodiments, the power source may include a photovoltaic cell, which can be used to recharge a battery or capacitor.

With further reference to FIG. 7, a user processing device 210 may be any data processing and/or communication device adapted for detection of the signal from the authentication device 260. In particular, the user device 210 may be any adapted device that an account holder uses to carry out an action and/or to communicate with an ASM 220, an action processing authority (e.g., an ASM manager system), or the action validation server 250. As shown in FIG. 3, this may include, without limitation, a smartphone 210a, a desktop computer 210b, a laptop computer 210c, and a tablet (not shown). In each case, the account holder device 210 includes an on-board data processor 211 in communication with a memory module 213, a user interface 214, and a communication interface 212. The device 210 may also include an image capturing device (e.g., a digital camera or scanner). The data processor 211 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 213 can be a read-only memory, write-once read-multiple memory or read/write memory, e.g., RAM, ROM and EEPROM, and the user device 210 can include one or more of these memories.

The user interface 214 includes a user input device or mechanism, which can be any device for entering information and instructions into the account holder device 210, such as a touch-screen, keyboard, mouse, cursor-control device, microphone, stylus, or digital camera. The user interface 214 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 212 is configured to establish and support wired or wireless data communication capability for connecting the device 210 to the network 230 or other communication network. The user device 210 may also include an NFC interface 219 that can be configured to support near field communication with an NFC transmitter/receiver. The NFC interface 212 may, in particular, be configured for near field communication with a chip-mounted NFC device 271 of a smart transaction card 270 associated with a transaction account.

In embodiments of the invention, the user device 210 includes a beacon monitor 215 in data communication with the data processor 211. The beacon monitor 215 is configured to receive and process transmissions from the beacons 270 via an antenna 216 or other beacon signal receiver, convert the signal to digital data, and forward the digital data to the data processor 211. The beacon monitor 215 may further be configured to determine the signal strength of a received transmission, which may allow the determination of a distance from the beacon 270. Depending on the embodiment, the beacon monitor 215 may be maintained in an inactive state unless activated by the data processor 211.

In embodiments of the invention, the memory 213 may have stored therein one or more applications usable by the data processor 211 to conduct and/or monitor transactions between the account holder device 210 and a merchant device or transaction processing system over the network 230. These applications may include instructions usable by the data processor 211 to identify transaction events, store event data in the memory 213, and communicate event data to a action request processor.

The memory 213 may have stored therein a beacon monitoring application. The beacon monitoring application is operable as a background application comprising a plurality of instructions usable by the data processor 211 to receive and process signal data from the beacon monitor 215. The beacon monitoring application may be configured to determine from the signal data beacon identity information for the beacon 270 broadcasting the signal from which the signal data is derived. Depending on the application, the location identity information may include one or both of the major and minor location identifiers of the broadcasting beacon 270.

In particular embodiments, the beacon monitoring application may be configured to receive instructions from the data processor 211 to change back and forth between an active state in which the beacon monitor 215 is activated and listening for beacon signals and an inactive state in which the beacon monitor 215 is not activated and beacon signals are not received. In alternative embodiments, the beacon monitor 215 may always be activated, but when the application is in the inactive state, received beacon signals are ignored. The beacon monitoring application may be further configured to receive an activation instruction from the action validation server 250 to change from the inactive state to the active state. Such an instruction could be received, for example, as part of a user validation request.

The beacon monitoring application may be further configured so that, when in the active state, the application causes the user device 210 to transmit beacon identification information to the facilitation server 250 for beacon signals received by the beacon monitor 215. In some embodiments, beacon identification information is transmitted for all received beacon signals. In other embodiments, such information may be transmitted only if predetermined criteria are met. This could include, for example, a requirement that the signal is above a defined strength threshold. It could also include date or time range requirements. The beacon identification information may be or include the beacon identifier or, in some cases, the raw signal information.

In certain embodiments, the memory 213 may have stored therein an action validation application associated with a user account for facilitating the use of the action validation system 200. This application may include instructions to receive a user validation request from the action validation server 250 and, in response, determine whether the authentication device 260 is within a predetermined proximity of the user device 210. The application may include further instructions to establish a positive or negative response based on the results of the proximity determination and to transmit the response to the action validation server 250 via the communication interface 212 and the network 230. For authentication device proximity determination, the action validation application may be configured to cause the data processor 211 to activate the beacon monitor 215 and to determine whether the beacon monitor 215 is receiving a signal from the beacon 270 of the authentication device. If no signal is received from the beacon 270, the application establishes a negative validation response. In some embodiments, a positive response is established if any signal is received from the beacon 270. In other embodiments, a positive response is established only if a signal exceeding a predetermined strength value is received. The application may be configured to instruct the data processor 211 to deactivate the beacon monitor 215 after a response has been established.

In some embodiments, the beacon monitor 215 may remain in an active state for detection of signals from the beacon 270. In such embodiments, the beacon monitoring application may be configured to maintain a raised proximity flag (e.g., set an integer value to 1) as long as a signal is being received from the beacon 270. If at any time the signal is lost (or signal strength drops below a certain value), the beacon monitoring application may drop the proximity flag (e.g., set the integer value to 0). In such embodiments, the validation application may be configured to establish a positive or negative validation result based on the value of the proximity flag.

The action validation application may be configured so that upon establishing a negative user validation response, the data processor 211 causes the user interface 214 to display a user validation prompt to the user. The user may then either confirm the negative validation result or, alternatively, override the result, thereby causing the user device to construct a positive user validation request response. The user validation result may then be transmitted to the action validation server 250.

Figure 8:
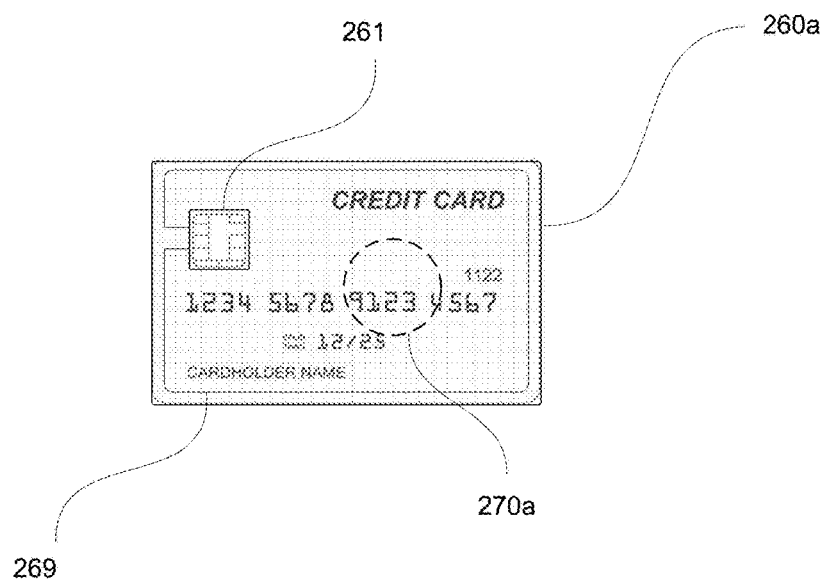
FIG. 8 is a schematic representation of a transaction card according to an embodiment of the invention.
Figure 9:
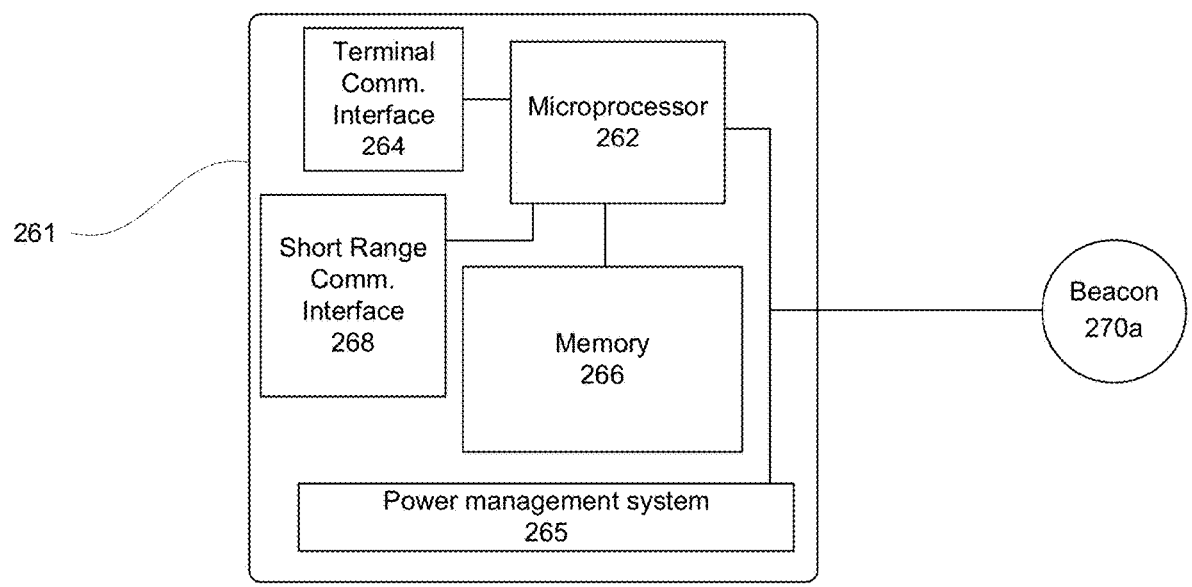
FIG. 9 is a schematic representation of a transaction card microprocessor chip and beacon usable in a transaction card according to an embodiment of the invention.
Figure 10:
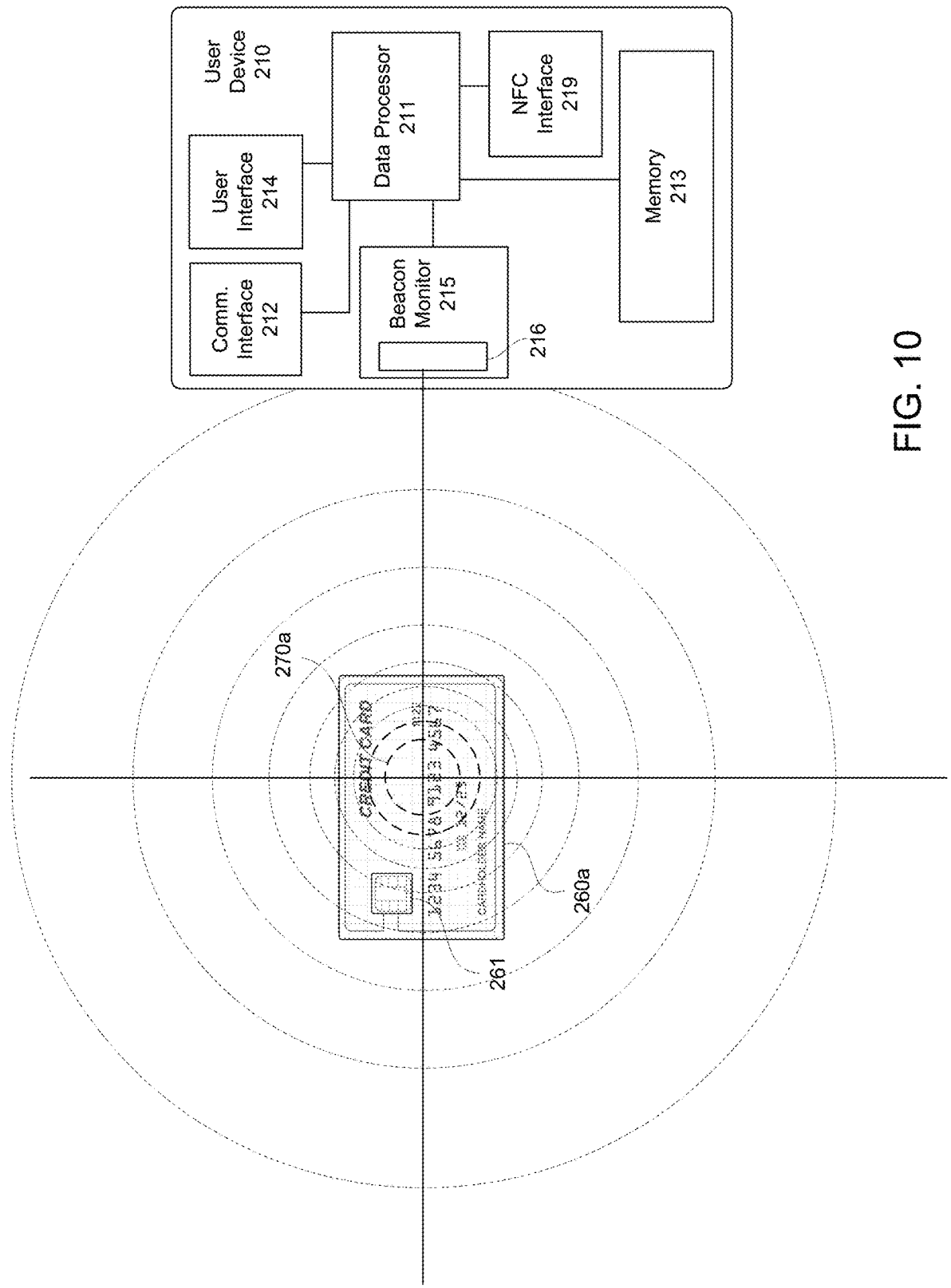
FIG. 10 is a schematic representation of a transaction card and a user data processing device according to embodiments of the invention.

As discussed above, the system authentication device 260 depicted in FIGS. 3 and 7 may be any substrate or device in which the authenticating beacon 270 is incorporated or to which the beacon 270 is attached. In particular embodiments of the invention, the authentication device may be or include a transaction card. The transaction cards used in methods of the invention may include chip-carrying transaction cards ("smart" cards) having electrical and/or near field or other short range communication capabilities. As illustrated in FIGS. 8-10, a typical transaction card 260a that is usable in various embodiments of the invention is a smart card with a microprocessor chip 261. The microprocessor chip 261 includes processing circuitry for storing and processing information, including a microprocessor 262 and a memory 266. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The transaction card 260a is configured for communication with transaction terminals and other device via a first communication interface 264. The interface 264 and the microprocessor 262 may, in particular, be configured for establishing communication with merchant transaction processing devices 140 for carrying out purchase and other transactions. The communication interface 264 may be configured to provide for contact-based communication, in which case the interface 264 may have electrical circuitry and contact pads on the surface of the card 260a for establishing direct electrical communication between the microprocessor 262 and the processing circuitry of a transaction terminal (e.g., ASM 220). Alternatively or in addition, the first communication interface 264 may be configured for contactless communication with the transaction terminal. In such embodiments, the communication interface 264 may be or include an NFC communication interface configured for communication with other NFC communication devices when the card 260a is within a predetermined NFC range. The communication interface 264 and the microprocessor 262 may also be configured for establishing NFC communication with the user device 110. In some embodiments, the microprocessor chip 261 may include a second communication interface 268 configured for establishing short range communication with the user device 110 via Bluetooth, or other short range communication methodology. In such embodiments, the transaction card 260a may have a short range communication antenna 269 that is included in or connected to the short range communication interface 268.

In some embodiments, the transaction card 260 may include a power management system 265, which may include a power source (e.g., a battery, capacitor, photovoltaic cell, kinetic or piezoelectric power scavenger, etc.) and circuitry for managing and distributing power to the components of the chip 261.

In particular embodiments, the transaction card 260a may be Bluetooth enabled using the microprocessor chip 261, the second communication interface 268 and the antenna 269. A Bluetooth-enabled transaction card may support Bluetooth Low Energy (BLE) and may be pairable to the user device 210. In some embodiments, pairing and communications may be established between the transaction card 260a and other interfacing devices, such as a terminal (not shown), a merchant transaction processor, and the like. A Bluetooth-enabled device may include the capabilities to establish a link between a card and the device (or pair the devices) using device settings (e.g., iOS or Android settings that manage Bluetooth connections) and/or mobile application(s) associated with the card issuer that can cooperate with the device controls to manage a Bluetooth connection with the card 260a.

In some embodiments, the short range communication interface 268 may itself be configured to operate as a low energy beacon 270 with a unique beacon identifier stored in the memory 213. In other embodiments, the transaction card 260a may have a separate beacon device 270a attached to the card substrate (e.g., to the back of the card). Such a beacon device 270a may be in electrical communication with the chip 261 and, in particular, to the power management system 265 for powering the beacon 270a. The beacon 270a may have a unique identifier permanently associated with a card identifier or an account identifier associated with the card 260a. Either type of beacon device may be configured to initiate operation upon initialization or distribution of the card 260a.

The memory 266 may be a read-only memory, write-once read-multiple memory or read/write memory, e.g., RAM, ROM, and EEPROM, and the chip 261 may include one or more of these memories. The memory 266 may have stored therein information associated with a transaction card account. In some embodiments, the memory 266 may have permanently stored therein a unique alphanumeric identifier associated with the account. It may also have permanently stored public and private card encryption keys. In some embodiments, the private and public encryption keys may be permanently hard-wired into the card memory.

The memory 266 may be configured to store one or more software applications for execution by the microprocessor 262. In various embodiments, the memory 266 may have stored therein instructions for generating encrypted information and transmitting it to a receiving device (e.g., the user device 210) via the first communication interface 264 (e.g., via NFC) or the short-range communication interface 268. Such encrypted information may be or include an encrypted verification block or signature that may be used to authenticate and verify the presence of the transaction card 260 during transaction processing. In embodiments of the invention, the card memory 266 may include an application including instructions configured for operation of the transaction card 260a as a cryptocurrency wallet.

For purposes of an action validation operation, the transaction card 260a may operate in the same manner as the previously described authentication device 260 with the user device 210 establishing a positive verification based on receiving a signal from the transaction card beacon.

Figure 11:
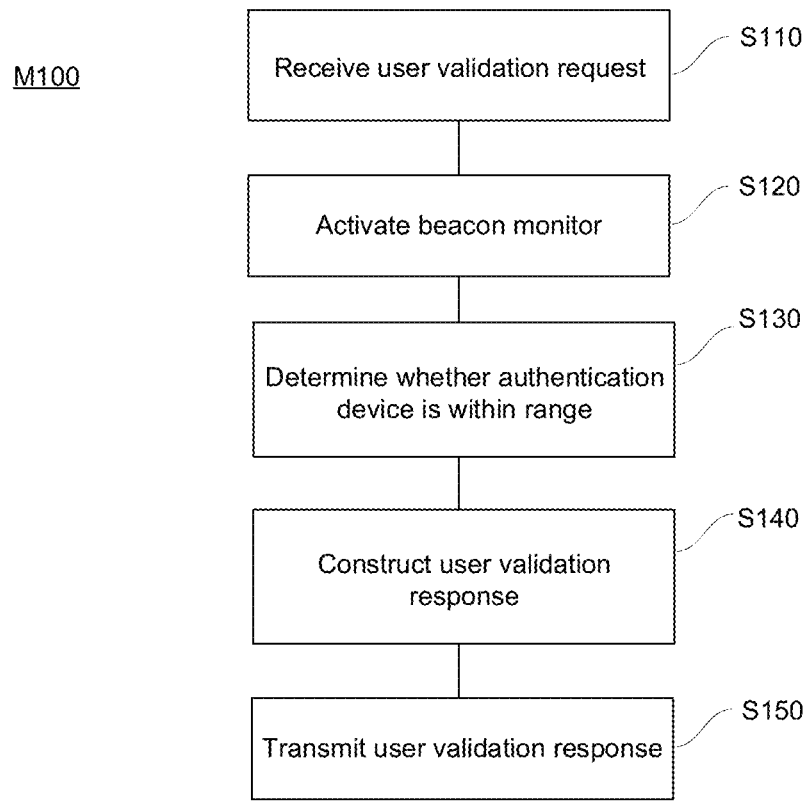
FIG. 11 is a block diagram of an automated method of validating an action according to an embodiment of the invention.

Validation systems according to the invention may be used to carry out methods according to various embodiments. FIG. 11 illustrates the actions in an illustrative method M100 for validating an action from the perspective of a user data processing device having features the same or similar to those described above. In particular, the user device includes a beacon monitor configured for receiving and processing a signal from the low energy beacon of an authentication device having features the same or similar to those described above. At S110, the data processor of the user device receives, from an action validation server, a request for user validation of an action. The request may include information about a requested action (e.g., type of transaction, requester information, location, etc.) and information sufficient to identify a particular authentication device or beacon to be used for validation. Authentication device identification information may include, for example, an identifier associated with the authentication device or the beacon or an account number from which the authentication device identifier can be determined. In embodiments where the authentication device is a transaction card, the unique transaction card identifier may be included in the request. In some embodiments, some or all of the action validation request information may be displayed to the user, automatically or in response to a prompted entry. At S120, the user data device data processor activates the beacon monitoring feature of the user device. This action may be taken in response to receiving the user validation request. In some embodiments, however, the beacon monitor may be activated based on other criteria or whenever the user device is powered on. At S130, the user device data processor determines whether the user device is within receiving range (or within a predetermined proximity) of the authentication device/beacon identified by the user validation request. This determination may include simply verifying that a signal transmitted by the appropriate beacon is being received by the beacon monitor. In some embodiments, the strength of the signal may be used to determine a relative proximity of the authentication device, which can be compared to a maximum acceptable distance for verification. At S140, the user data processor constructs a user validation request response that includes an indication of a positive validation result if the authentication device is within an acceptable proximity to the user device or a negative validation result if no signal is received from the authentication device or if the authentication device is otherwise not within an acceptable proximity of the user device. At S150, the user device transmits the user validation request response to the action validation server.

In some embodiments, if no signal is received from the authentication device or if the signal indicates that the authentication device is not within the required proximity of the user device, the user device may, prior to constructing the user validation request response, display a user validation prompt to the user on a display of the user data processing device. The user may then either confirm the negative validation result or, alternatively, override the result, thereby causing the user device to construct a positive user validation request response.

Figure 12:
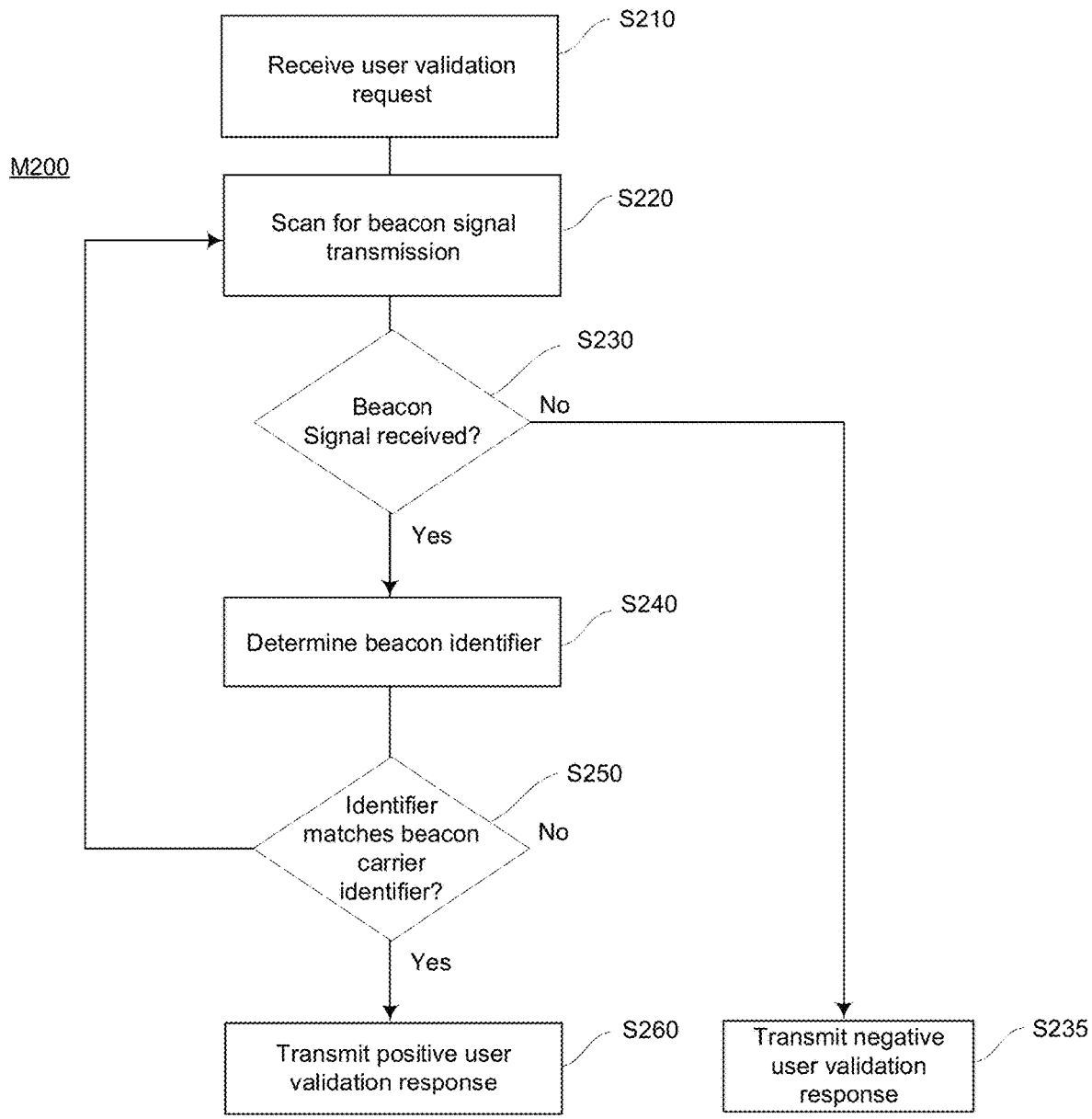
FIG. 12 is a block diagram of an automated method of validating an action according to an embodiment of the invention.

FIG. 12 illustrates the actions in an illustrative method M200 for validating an action from the perspective of a user device having features the same or similar to those described above. In particular, the user device includes a beacon monitor configured for receiving and processing a signal from the low energy beacon of an authentication device having features the same or similar to those described above. In this embodiment, the method accounts for the possibility that multiple beacon signals may be received when the device is requested to verify the presence of an authentication device carrying a particular beacon. At S210, the data processor of the user device receives, from an action validation server, a request for user validation of an action. The request may include information about a requested action (e.g., type of transaction, requester information, location, etc.) and information sufficient to identify a particular authentication device or beacon to be used for validation. In some embodiments, some or all of the action validation request information may be displayed to the user, automatically or in response to a prompted entry. At S220, the user device beacon monitor scans for beacon signal transmissions. At S230, a determination is made as to whether any beacon signal is received. If not, user device processor proceeds to construct and transmit a negative user validation response at S235. If a beacon signal is received, the user device data processor determines the beacon identifier from the received signal at S240. At S250, the user device data processor determines whether the identifier matches the expected identifier for the authentication device identified from the user validation request. If the identifier matches, the user data processor may construct and transmit to the action validation server a positive validation response at S260. In some embodiments, the positive response may be further conditioned on a signal strength-based proximity determination confirming that the authentication device is within an acceptable proximity. If the identifier does not match the identifier associated with the authentication device, the user device may return to S220 to scan for additional beacon signals. The actions S220, S230, S240, and S250 may be repeated until the authentication device beacon is identified or until no further signals are found.

Figure 13:
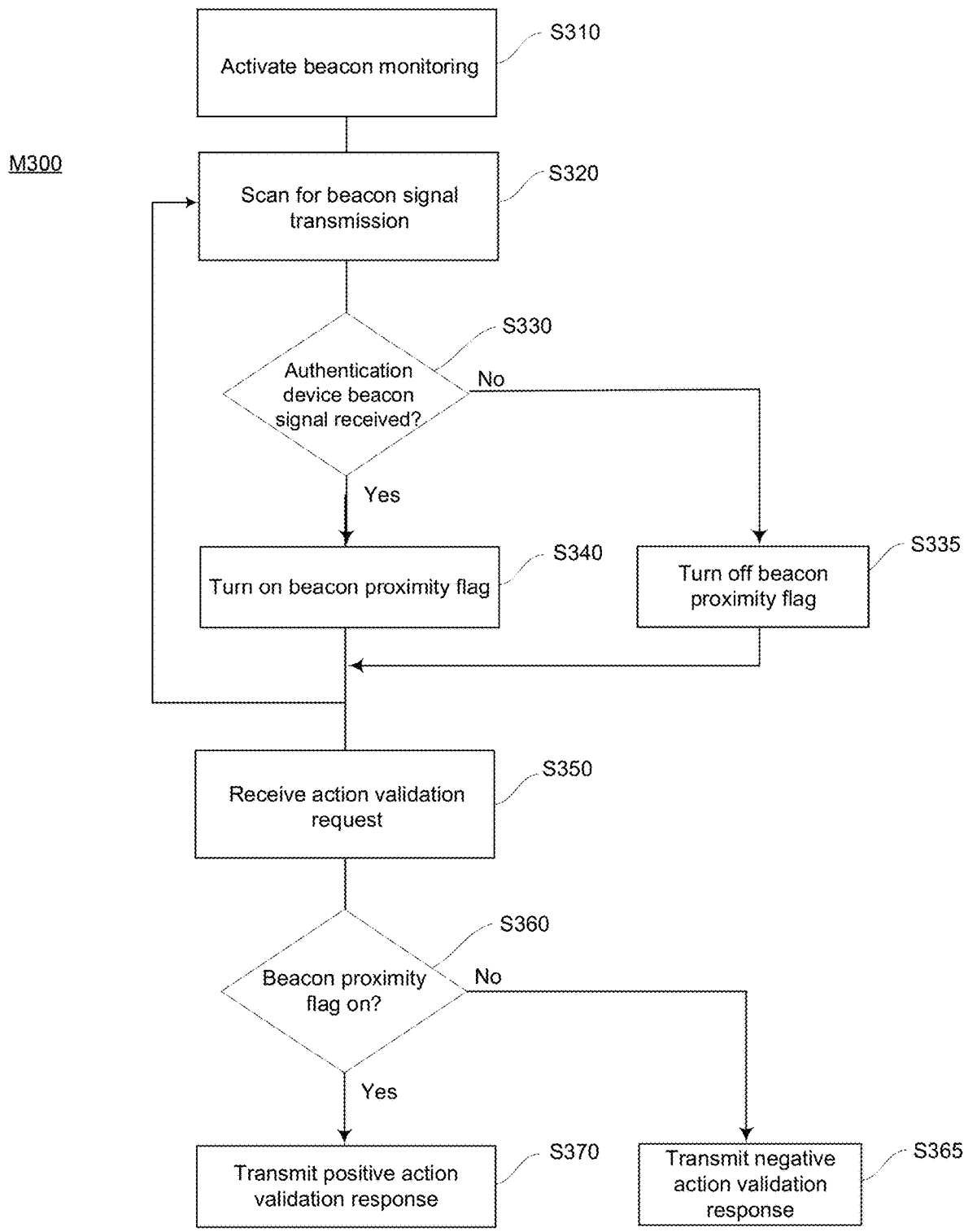
FIG. 13 is a block diagram of an automated method of validating an action according to an embodiment of the invention.

FIG. 13 illustrates the actions in an illustrative method M300 for validating an action from the perspective of a user device having features the same or similar to those described above. In particular, the user device includes a beacon monitor configured for receiving and processing a signal from the low energy beacon of an authentication device having features the same or similar to those described above. In this embodiment, the user device may continuously or periodically track the proximity of the authentication device in advance of any action validation requests. At S310, the user device data processor activates the beacon monitoring feature of the user device. At S320, the user device beacon monitor scans for the authentication device beacon signal. At S330, a determination is made as to whether the authentication device beacon signal is received. If not, the user device processor sets or maintains a zero value for the beacon proximity flag, indicating that the authentication device is not transmitting or is otherwise not within the receiving range of the user device. If the appropriate beacon signal is received, the user device data processor, at S340, sets the beacon proximity flag to one indicating that the authentication device is within the required proximity. In some embodiments, raising the proximity flag may be further conditioned on a signal strength-based proximity determination confirming that the authentication device is within an acceptable proximity. The actions S320, S330, S340, and S335 may be repeated periodically or continuously to assure that the proximity flag value is always indicative of the proximity of the authentication device to the user device.

At S350, the user device data processor receives, from an action validation server, a request for user validation of an action. The request may include information about a requested action (e.g., type of transaction, requester information, location, etc.) and information sufficient to identify a particular authentication device or beacon to be used for validation. In some embodiments, some or all of the action validation request information may be displayed to the user, automatically or in response to a prompted entry. At S360, the user device data processor determines whether the beacon proximity flag is on (e.g., set to one) or off (e.g., set to zero). If the proximity flag is off, the user data processor constructs and transmits a negative user validation response at S365. If the proximity flag is on, the user data processor may construct and transmit to the action validation server a positive validation response at S370. In some embodiments, the positive response may be further conditioned on a signal strength-based proximity determination confirming that the authentication device is within an acceptable proximity.

Figure 14:
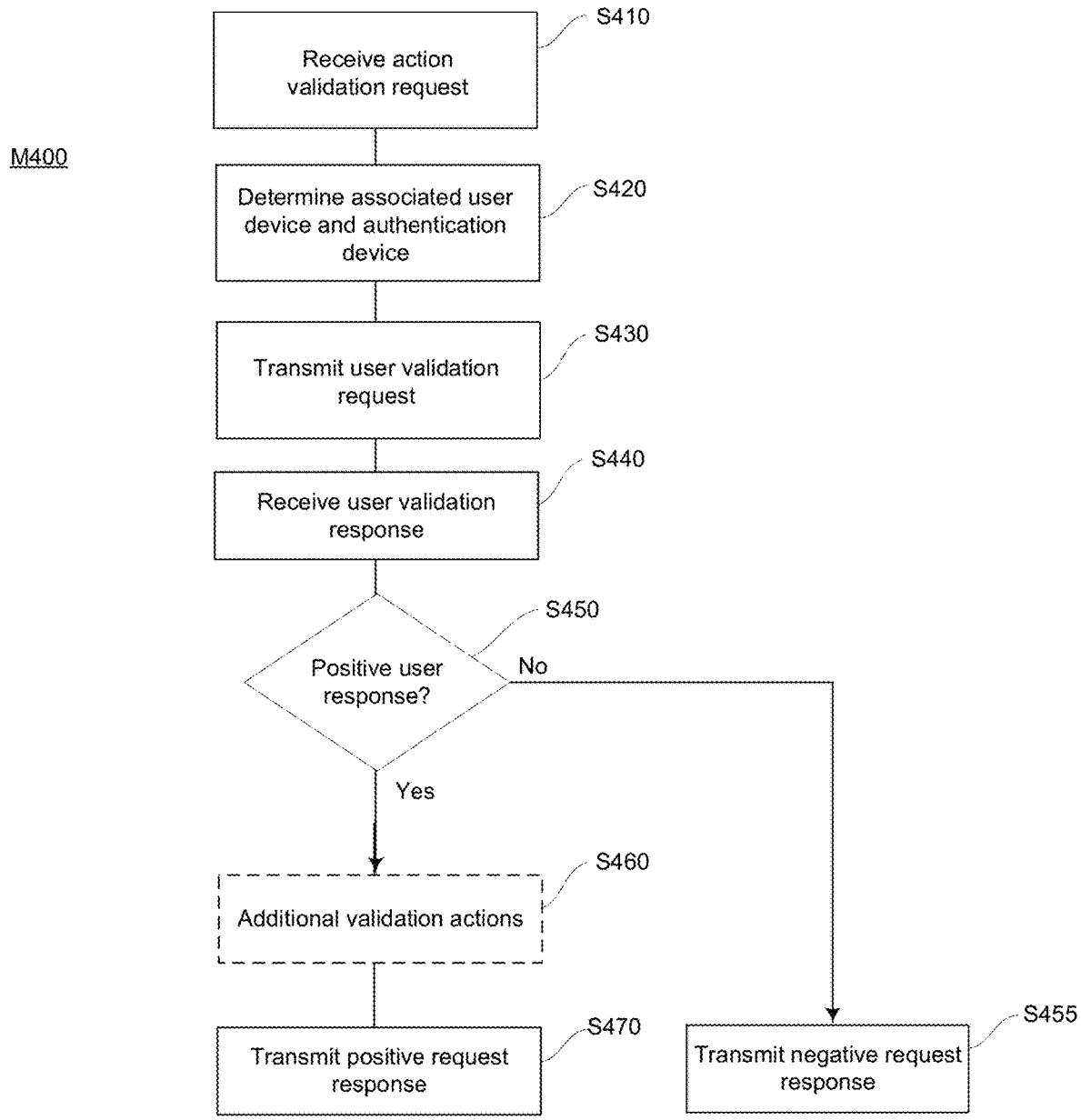
FIG. 14 is a block diagram of an automated method of validating an action according to an embodiment of the invention.

FIG. 14 illustrates the actions in an illustrative method M400 for validating an action from the perspective of an action validation server having features the same or similar to those in the embodiments described above. At S410, the action validation server receives an action validation request from a requesting system (e.g., an ASM, ASM administrator, or other action processing entity). The action validation request may include identification information usable by the request processor to identify the requesting system and a user device and/or account associated with a particular user or users. The request may further include information about the action being requested. This may include information indicating the type and characteristics of the action. In instances where the action relates to a financial transaction, the information may include details of the type of transaction and the monetary amounts involved. In some embodiments, the action request information may also include action implementation or requester location information. At S420, the action validation server may use the information from the request to determine the appropriate authentication device for validating the action and one or more user devices associated with the authentication device. This may include identifying a user account and/or obtaining additional account or user device information from records stored in a user or account database. In some embodiments, the request information includes information usable by the action request processor to conduct an initial authorization verification to assure that the user and/or the requester is authorized to request and carry out the requested action. In some embodiments, this may require obtaining authorized action validation requester information from a requester database. At S430, the action validation server constructs and transmits a user validation request to one or more user devices associated with the user account identified in or determined based on the action validation request information. The user validation request is configured to instruct the receiving user device to verify that the authentication device is present within a certain proximity of the user device. The user validation request may include some or all of the action request information. Alternatively, the user validation request may include no action information, and is configured solely to elicit verification of the presence of the authentication device. The action validation server receives a user response from one of the user devices at S440 and, at S450, determines whether the user response includes a positive validation indication. If the user response is negative (indicating the authentication device is not within an acceptable proximity to one of the user devices), the validation server constructs and transmits at S455 a negative action validation response to the requesting device or system. This may include an instruction to deny or terminate processing of the action. If the user response is positive (indicating the authentication device is present within the required proximity of one of the user devices), the validation server constructs and transmits at S470 a positive action validation response to the requesting device or system. In some embodiments, the positive validation response may be conditioned on additional validation actions S460.

The present invention provides a significant security improvement for remotely initiated computer-implemented actions. The improvement is accomplished by requiring communication, not only with a user device associated with an account or user associated with the action request, but also with a separate beacon-equipped authentication device. This assures that even if a user device is compromised or lost, an action requester purporting to be the user/account holder will be denied unless the requester also has the authentication device. Thus, in a scenario where a company computer system is compromised, an invasive entity purporting to be a particular employee would be unable to initiate system-implemented actions without an authentication device (e.g., a beacon-equipped company badge) associated with the employee being in proximity to the user device. In another scenario, if a financial account holder's user device is compromised, an invasive entity purporting to carry out a remote financial transaction using the account holder's account information would be denied unless an authentication device (e.g., a beacon-equipped transaction card) associated with the employee being in proximity to the user device.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated method for validating an action based on beacon source proximity, the method comprising:
    receiving, by a user data processing device from a remote action validation server, an action validation request, the action validation request comprising: (i) identification of an authentication device comprising a smart card belonging to the user, the smart card including a beacon transmitter, and (ii) identification of a proposed action;
    activating, by the user data processing device, a beacon monitor;
    scanning, by the beacon monitor, for a beacon signal from the beacon transmitter of the smart card;
    determining, by the beacon monitor, whether the beacon signal is received based on the scanning;
    turning on a beacon proximity flag based on (1) determining the beacon signal is received and (2) determining that the received beacon signal includes a signal strength capable of confirming that the smart card is within an acceptable proximity of the user data processing device; and
    transmitting, by the user data processing device to the remote action validation server, an action validation response based on the beacon proximity flag.

2. An automated method according to claim 1 wherein the action of determining whether the authentication device is within beacon signal reception range includes:
    scanning, by the user data processing device, a beacon signal transmission band for beacon signal transmissions; and
    responsive to receiving a transmitted beacon signal,
        determining a beacon signal source identifier from the transmitted beacon signal, and
        determining whether the beacon signal source identifier matches an identifier for the beacon transmitter attached to the authentication device.

3. An automated method according to claim 2 further comprising:
    responsive to a determination that the authentication device is within beacon signal range of the user data processing device, including a positive action validation in the action validation response.

4. An automated method according to claim 3 further comprising:
    responsive to a determination that the authentication device is not within beacon signal range of the user data processing device, including a negative action validation in the action validation response.

5. An automated method according to claim 3 further comprising:
    responsive to a determination that the authentication device is not within beacon signal range of the user data processing device,
        displaying a user validation prompt on a display of the user data processing device,
        receiving a positive or negative user validation response from a user via user interface of the data processing device, and
        including the positive or negative user validation response in the action validation response.

6. An automated method according to claim 2 wherein the action of determining whether the authentication device is within beacon signal reception range is carried out on a continuous or regular periodic basis.

7. An automated method according to claim 2 wherein the action of determining whether the authentication device is within beacon signal reception range is carried out in response to receiving the action validation request.

8. An automated method according to claim 2 wherein the beacon transmitter is a Bluetooth low energy (BLE) transmitter configured for transmitting a beacon identifier at regular intervals.

9. An automated method according to claim 4 wherein the beacon transmitter the beacon signal reception range is less than 10.0 feet.

10. An automated method according to claim 4 wherein the beacon signal reception range is in a range of 1.5 feet to 3.0 feet.

11. An automated method according to claim 2 wherein the authentication device is a transaction card.

12. An action validation user data processing device comprising:
    a data processor;
    a wireless communication interface in communication with the data processor and configured for selective communication over a wireless network;
    a beacon signal receiver configured for interfacing with a smart card belonging to a user, the smart card including a transmitting beacon;
    a user interface comprising at least a user input device and a display;
    a memory accessible by the data processor, the memory having stored thereon
        a beacon monitoring application including instructions for the data processor to receive the beacon signal from the beacon signal receiver, process the beacon signal to identify the transmitting beacon, and
        an action validation application including instructions for the data processor to:
            receive, from a remote action validation server via the wireless communication interface, an action validation request including identification of an authentication device comprising the smart card having a beacon transmitter attached thereto and identification of a proposed action associated with the authentication device;
            activate the beacon signal receiver:
            scan, by beacon signal receiver, for a beacon signal from the transmitting beacon of the smart card;
            determine, by the beacon signal receiver, whether the beacon signal is received based on the scanning,
            turn on a beacon proximity flag based on (1) determining the beacon signal is received and (2) determining that the received beacon signal includes a signal strength capable of confirming that the smart card is within an acceptable proximity of the user data processing device; and transmit, to the remote action validation server via the wireless communication interface, an action validation response based on the beacon proximity flag.

13. An action validation user data processing device according to claim 12 wherein
the beacon monitoring application has an active state in which the mobile action validation interface device is capable of receiving beacon transmitted signals and an inactive state in which the mobile action validation interface device is incapable of receiving beacon transmitted signals, and
the action validation application includes further instructions for the data processor to, responsive to receiving the action validation request, transition the beacon monitoring application from the inactive state to the active state.

14. An action validation user data processing device according to claim 12 wherein the action validation application includes further instructions for the data processor to, responsive to a determination that the authentication device is within beacon signal range of the mobile action validation interface device, include in the action validation response a positive action validation.

15. An action validation user data processing device according to claim 12 wherein the action validation application includes further instructions for the data processor to, responsive to a determination that the authentication device is not within beacon signal range of the mobile action validation interface device,
display a user validation prompt on the display of the user interface,
receive a positive or negative user validation response from a user via the user input device, and
include the positive or negative user validation response in the action validation response.

16. An action validation system comprising
a transaction card comprising a smart card belonging to a user including
a beacon signal transmitter configured for low energy radio transmission, continuously or at regular intervals, of a beacon signal comprising a beacon identifier associated with the transaction card, and
a beacon transmitter power source in electrical communication with the beacon signal transmitter; and
a user data processing device including
a user device data processor,
a wireless communication interface in communication with the data processor and configured for selective communication over a wireless network,
a beacon signal receiver configured for receiving the beacon signal,
a user interface comprising at least a user input device and a display;
a memory accessible by the data processor, the memory having stored thereon
a beacon monitoring application including instructions for the data processor to receive the beacon signal from the beacon signal receiver, process the beacon signal to determine the beacon identifier, and
an action validation application including instructions for the data processor to:
receive, from a remote transaction validation processing system via the wireless communication interface, an action validation request including identification of the smart card and identification of a proposed transaction for an account associated with the smart card;
activate the beacon signal receiver;
scan, by the beacon signal receiver, for a beacon signal from the beacon signal transmitter of the smart card;
determine, by the beacon signal receiver, whether the beacon signal is received based on the scanning;
turn on a beacon proximity flag based on (1) determining the beacon signal is received and (2) determining that the received beacon signal includes a signal strength capable of confirming that the smart card is within an acceptable proximity of the user data processing device; and
transmit, to the remote transaction validation processing system via the wireless communication interface, an action validation response based on the beacon proximity flag.

17. An action validation system according to claim 16 wherein
the beacon monitoring application has an active state in which the user data processing device is capable of receiving beacon transmitted signals and an inactive state in which the user data processing device is incapable of receiving beacon transmitted signals, and
the action validation application includes further instructions for the data processor to, responsive to receiving the action validation request, transition the beacon monitoring application from the inactive state to the active state.

18. An action validation system according to claim 16 wherein the action validation application includes further instructions for the data processor to, responsive to a determination that the transaction card is within beacon signal range of the user data processing device, include in the action validation response a positive action validation.

19. An action validation system according to claim 16 wherein
the beacon signal transmitter is a Bluetooth low energy (BLE) transmitter configured for transmitting the identifier at regular intervals, and
the beacon signal reception range is less than 5.0 feet.

20. An action validation system according to claim 16 wherein the beacon transmitter power source comprises at least one of the set consisting of a photovoltaic energy cell and a kinetic energy scavenging device.

* * * * *